US006326946B1

(12) United States Patent
Moran et al.

(10) Patent No.: US 6,326,946 B1
(45) Date of Patent: *Dec. 4, 2001

(54) OPERATOR ICONS FOR INFORMATION COLLAGES

(75) Inventors: Thomas P. Moran, Palo Alto; Eric Saund, San Carlos; Beverly L. Harrison, Palo Alto; Roy Want; William J. van Melle, both of Los Altos; Kenneth P. Fishkin, Redwood City; Anuj Uday Gujar, Palo Alto, all of CA (US)

(73) Assignee: Xerox Corporation, Stamford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/156,031

(22) Filed: Sep. 17, 1998

(51) Int. Cl.[7] .................................................... G09G 5/00
(52) U.S. Cl. ...................... 345/156; 345/173; 340/568.8
(58) Field of Search ................................. 345/156, 157, 345/158, 168, 169, 173, 1.1, 1.2, 2.1, 2.2, 2.3, 3.1; 340/572.1, 568.8, 825.54, 825.49, 825.52, 825.28, 825.2, 825.06, 825.08; 235/375, 385

(56) References Cited

U.S. PATENT DOCUMENTS

| 4,862,160 | * | 8/1989 | Ekchian et al. ................. 340/825.54 |
| 5,408,443 | * | 4/1995 | Weinberger ............................. 368/10 |
| 5,786,764 | * | 7/1998 | Engellenner ......................... 340/572 |
| 5,801,628 | * | 9/1998 | Maloney ............................ 340/568.2 |
| 6,005,482 | * | 12/1999 | Moran et al. ..................... 340/568.8 |

* cited by examiner

Primary Examiner—Xiao Wu (57) ABSTRACT

An enhanced information collage that combines a computational system with a physical information collage to preserve the advantages of conventional information collages while alleviating many problems associated with such collages. A physical information collage (e.g. a pin board with spatially differentiated pin mounted task cards, each card having a detectable identity tag) can be made part of a computational system by sensing the identity, position, and contents of the collage component artifacts. In effect, each collage component has its content and position stored in a database, with movement of a particular component resulting in update of the database to record the new position of that component. Further provided are Operator Icon components which may be used to provide digital services, such as combining, erasing, saving, or transferring, to other collage components.

5 Claims, 9 Drawing Sheets

OPERATOR ICONS FOR INFORMATION COLLAGES

FIELD OF THE INVENTION

The present invention relates to identification and localization of physical documents arranged on a surface. More particularly, a system architecture facilitating association of electronic data and electronically tagged or visually identifiable documents arranged on a surface is described.

BACKGROUND AND SUMMARY OF THE INVENTION

Information collages are physical artifacts that are assembled, manipulated, and maintained to create, alter, preserve, share, or coordinate information. For example, wall mounted pin boards or magnetic boards can be used by an individual or group to transiently or semi-permanently display documents, calendars, task schedules, phone number lists, project proposals, informational flyers, meeting announcements, photographs, maps, or any other desired information. In some cases, small physical artifacts such as keys or magnetic icons can even be attached to the surface.

Advantageously, such information collages allow for ready manipulation of surface mounted documents or artifacts through addition, removal, replacement, reordering, or stacking. For example, a team's project schedule might be represented on a wall mounted pin board by pin attached task cards arranged in a timeline format. Such task cards can be easily altered or physically moved with respect to a displayed timeline as people leave a project, schedules slip, or any other problems develop. Unfortunately, this easy alteration of information in the collage by individuals or group members presents its own set of problems. Attached task cards can be inappropriately removed, misplaced, or obscured. Recording state of the pin board at a given time for electronic archival or tracking purposes can require substantial efforts, and it is difficult to synchronize and transfer the information in the collage to group members not physically present at a site.

Accordingly, the present invention automatically or semi-automatically integrates a computational system with an information collage to preserve the advantages of conventional information collages while alleviating many problems associated with such collages. A physical information collage (e.g. a pin board with spatially differentiated pin mounted task cards, each card having a detectable identity tag) can be made part of a computational system by sensing the identity, position, and contents of the component artifacts. In effect, each task card has its content and position stored in a database, with movement of a particular task card automatically resulting in update of the database to record the new position of that task card.

In certain embodiments, an enhanced information collage has a surface that supports a plurality of detachable collage components. These collage components are typically documents, but may be physical icons, or other small physical artifacts attachable by magnets, pins, adhesives, frictional forces, or other conventional attachment mechanisms. An identification unit determines informational content of at least some of the plurality of collage components using various sensing modalities (including but not limited to camera, radio, infrared, radio, acoustic, or electrical based techniques). Information can be directly determined by transfer/reading of information (which may be either an address to an electronic document, or the document information itself) from a collage component, or determined by position based associations maintained between an electronic document and a collage component.

Position of the document can be determined by a location unit for tracking position of at least some of the plurality of collage components. Like the identification unit, the location unit can use various sensing modalities alone or in combination (including, but not limited to camera, radio, infrared, radio, acoustic, or electrical techniques) to track position of collage components. The identification unit and location unit together provides an information maintenance and archival system with information necessary for constructing a series of time dependent snapshots of position and informational content of at least some of the plurality of collage components. This information maintenance system is updateable to reflect changes in position and informational content of at least some of the plurality of collage components, while still retaining a time/action addressable record of state changes of the plurality of collage components. This allows, for example, a user to digitally replay changes in a collage, or determine the collage state a day, a week, or a month earlier.

As will be appreciated by those skilled in the art, certain collage components may not be merely associated with electronic data (e.g. an electronically available text document or picture), but may actually "operate" on other collage components to define data relationships between collage components. Data can be altered, combined, erased, saved, augmented, transferred, or otherwise modified through provision of various digital services associated with "operator icons". In operation, a collage component having associated electronic data is physically associated with an operator icon, causing modification of that associated electronic data in response to physical association of the operator icon with collage component. For example, consider a first collage component representing a document and a second collage component representing user of the information collage. An operator icon symbolically configured as a pointing arrow can be positioned on the surface of the information collage to point from the first collage component to the second collage component. This association causes the system to electronically mail the first document to the user. Reversal of the arrow so that the arrow points from the user to the document can result in modification of document properties so that the user is linked to the document and informed of any updates, changes, or alterations to the document. Alternatively, an arrow shaped operator icon can be used to link a document to a printer or other external digital service, depending on the particular operation or digital service previously registered with the information maintenance and archival system.

As those skilled in the art will appreciate, registration of operator properties can be dynamically defined by a user interacting with collage components. For example, a user can dynamically define a digital service associable with an operator icon by physically associating at least one additional operator icon with the operator icon; by associating user definable text with the operator icon; by associating audibly announced actions with the operator icon; by associating gestural actions with the operator icon; by associating a spatially discrete zone of the information collage with the operator icon, with the spatially discrete zone having an associated digital service (e.g. print, group, save), or by any other suitable user definable action interpretable by the system as an instruction to link a digital service to a generic operator icon. After the particular digital service linked to a digital service has been transiently, semi-permanently, or permanently defined by a user, the physical association between the operator icon and the collage component is used to determine the particular required data modifications (which may include digital services or other data parametrizable functions).

For example, in one possible embodiment of the present invention a generic bar shaped physical icon can be used as an audio level control for a sound system connected to the information collage. A user registers linkage of the bar shaped physical icon to the audio level control system by writing "VOLUME" next to the physical icon. These characters can be automatically recognized by a camera based character recognition and analysis system viewing the information collage, and necessary modifications made to registry databases in the information maintenance system. The actual level adjustments can be made by moving another physical icon along the bar shaped physical icon, an action that is interpreted as changing audio levels.

Advantageously, the foregoing system allows applications such as workflow organizers, spreadsheets, in/out boards, geographical information systems, outliners, software construction kits, software verification systems, or any other general or special-purpose software application (with or without connection to external digitally controlled or monitorable physical systems) to execute operations based on some interpretation of user activities ("events") on the information collage. These events can be interpreted implicitly; through use of explicit operator icons; through generic, user definable, operator icons; or as part of a "visual language".

As will be appreciated, any sensed user action at the surface of an information collage can implicitly evoke an operation by an application. For example, putting a person icon next to a task card can assign the task to the person and email a reminder to the person. This is accomplished by a special-purpose application that knows how to interpret actions on the particular information collage, which in this case is used for group task management. The implicit actions on the board of the information collage will generally require the system to recognize and interpret spatial relationships (e.g., adjacency, alignment, enclosure) among collage components, diagrammatic annotations (e.g., encirclements or links), manual gestures, or other modes of interactions with the collage.

In contrast, operations can be explicitly invoked through operator icons that direct data flow or otherwise initiate invocation of application mediated services. For example, an operator icon can be associated with a particular operation (e.g., print). Actions on or with that icon can cause particular operations (i.e. the operator on specific operands) to be invoked. The actions may involve placing the operator icon in various spatial relationships, binding the operator to certain actions or objects (e.g., a link drawn between it and an operand), or acting in a temporal sequence (e.g., touching an operator icon and then touching another icon on which the operation is performed), etc.

Explicit operator icons can be defined in advance of use (e.g., a printer shaped icon that "prints" documents to which it is touched). Alternatively, operator icons can be dynamically defined by a user of an information collage (e.g., a square icon on which a user first writes the word "print" thereafter causes printing of documents to which it is touched). Sets of icons can be grouped together by touching, stacking, aligning, etc, to form user-defined "packages" of icons that can be to define various particular actions (e.g. using stacked icons for printing and saving to file for invoking an application to print and save to file a document touched by the compound icon). In a broad sense, operator icons and other information collage components can define a visual language. For example, a user can construct an interpretable command ("imperative sentence") through spatially or temporally arranged groups of icons.

Additional functions, objects, advantages, and features of the present invention will become apparent from consideration of the following description and drawings of preferred embodiments.

DETAILED DESCRIPTION OF THE INVENTION

Figure 1:
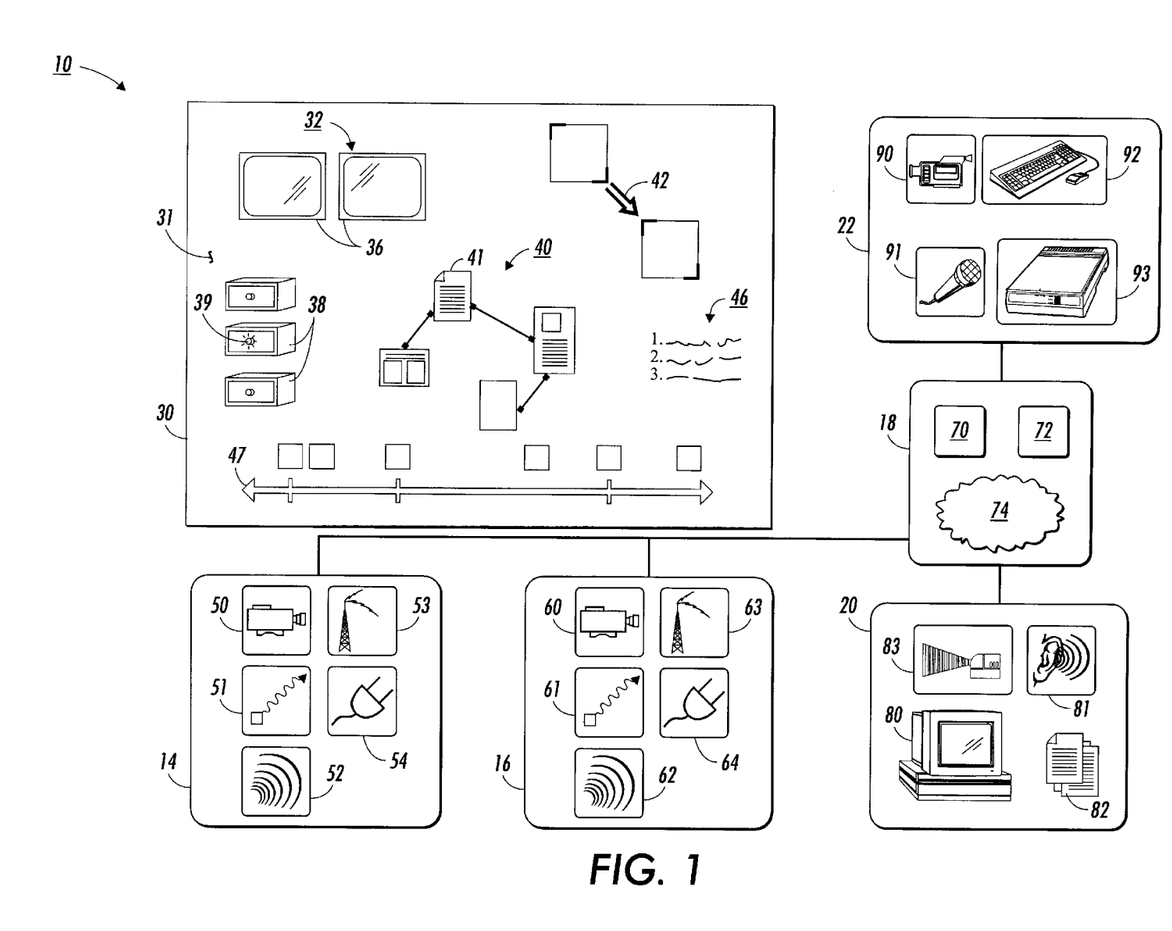
FIG. 1 schematically illustrates an enhanced information collage in accordance with the present invention.

As illustrated with respect to FIG. 1, a system 10 supporting an enhanced information collage includes an identification unit 14 for determining informational content of collage components and location unit 16 for tracking position of collage components. An information processing system 18 for maintenance and archival is connected to both the identification unit 14 and the location unit 16 for electronically storing collage state, including position and informational content of collage components. In operation, the information system 18 handling information maintenance and archiving is updateable to reflect changes in position and informational content of at least some of the plurality of collage components. A user (not shown) can receive information concerning current or past collage state from a user output system 20, while user modifications to collage state can be optionally entered through user input system 22.

The enhanced information collage is deployed on a surface 30. The surface 30 can be continuous and integral, or may be composed of multiple discrete and unconnected surfaces. The surface 30 can be formed from any suitable surface capable of retaining objects, and can include but is not limited to conventional walls, ceilings, floors, pinboards, writeable chalkboards or porcelain boards, desktops, tabletops, or even hanging tapestries. Surface 30 can be fixed or movable, and can include infolds or outfolds, chambers, or other associated three dimensional containers. For example, a desktop, a wall adjacent to the desktop, and a file drawer in another room can together form a surface that supports an enhanced information collage. In other embodiments, merely a single wall mounted pin-board capable of holding pin or clip attached objects may form the enhanced information collage surface. In a typical embodiment of the present invention, a board 31 mounted to a wall in a corridor or room can be used.

Collage components can include physical artifacts 32 positioned at defined spatial locations on the surface 30 (board 31 as shown). Physical artifacts 32 are typically documents 40 that may include but are not limited to paper based textual documents 41, small electronic display screens 36, or textual material 46 or graphical material 47 written directly on surface 30. Physical artifacts may also include wall mounted containers 38 having signaling lights 39, or attachable symbolic icons such as arrow 42. As will be appreciated, physical artifacts 32 typically include the various documents, notecards, calendars, task schedules, phone number lists, project proposals, informational flyers, meeting announcements, photographs, maps, keys, or magnetic icons commonly used to organize or disseminate information for individuals or groups. The physical artifacts can be permanently or detachably affixed by pins, clips, adhesives, strings, or other fixatives to the surface 30, or may be simply rest upon the surface 30 in suitable embodiments (e.g. a tabletop surface).

For purposes of the present invention, documents or other data associated with physical artifacts should be accessible after automatic or semi-automatic identification of a particular physical artifact by identification unit 14 of system 10. Identification of a physical artifact 32 by identification unit 14 can be through camera based optical viewing systems 50, infrared systems 51, acoustic systems 52, radiofrequency systems 53, electromechanical systems 54, or any other conventional sensor system capable of accurately identifying physical artifacts 32. Identification can be based on active transmission of identification codes and document data by electronic tags, infrared transceivers, acoustic (ultrasonic transceivers), radiofrequency transmitters, or other conventional electronic data transmitter physically associated with a physical artifact. Alternatively, optically scannable one or two dimensional bar codes, glyphs, text, or printed data present on a physical artifact can be used to identify physical artifacts. Document content or other data associated with an identified physical artifact can be determined directly from a physical artifact generated signal, or can be accessed from an electronic document database in response to transmission of an electronic address, URL, database record number, or other suitable document or data tracking information.

Like document identification, the system 10 of the present invention allows for automatic or semi-automatic location of specific physical artifacts 32. Specifying absolute or relative location of a physical artifact 32 by identification unit 14 can be through camera based optical viewing systems 60, infrared systems 61, acoustic systems 62, radiofrequency systems 63, electromechanical systems 64, or any other conventional sensor system capable of accurately determining location of physical artifacts 32. Location can be based on active transmission of absolute or relative location data by electronic tags, infrared transceivers, acoustic (ultrasonic transceivers), radiofrequency transmitters, or other conventional electronic data transmitter physically associated with a physical artifact. Alternatively, cameras, tactile sensors, or other suitable systems can be used to determine location of documents that may not otherwise be emitting identification signals. Semi-automatic systems that require manual input of location (such as may be provided in conjunction with a visual grid on the surface 32) are also within the scope of the present invention.

As will be appreciated, in certain embodiments of the invention the identification unit 14 and the location unit 16 can use the same sensor systems. For example, a camera coupled with an advanced image interpretation system can be used to both spatially localize a document in a panning or widefield mode, and directly read attached bar codes, glyphs, or other document identifying symbols in a camera zoom mode. However, in other embodiments of the invention the sensor systems used to identify documents and localize them may be distinct. For example, a pressure sensitive grid underlying a document can be used to localize position of a pin attaching a document to the surface 32, while infrared or radio tags are used to broadcast identification information relating to a document.

Information received from the identification unit 14 and the location unit 16 is stored in the information processing system 18. The system 18 includes an information collage server capable of performing computations to identify and track changes in state of the information collage. A local computer 70, an information database server 72, a networked computer system 74, or some combination of local and networked databases can be used for running the system 18 and for storage of electronic documents physically referenced by the information collage and electronically referenced by the information collage server. For certain applications, various additional processing systems optimized for image processing, audio processing, or database management may also be used to facilitate operation of the information processing, maintenance and archival system 18.

A user (not shown) can receive information concerning current or past information collage state from the user output system 20 that includes computer attached status monitor 80, computer controlled speech (audio) feedback module 81, computer printed documents 82, or even a suitable projector system 83. Similarly, the user input unit 22 includes camera (video) input module 90, audio input module 91, keyboard/mouse input 92, scanner input 93, or any other suitable computer input system that allows for addition of user annotations, modifications, inquiries, or searches relevant to current or past state of the information collage. As will be appreciated, both input and output can be local (at the physical site of the information collage) or remote (for example, by network or internetwork connection).

Advantageously, in conjunction with appropriate identification, location, user input, and user output systems, the information collage system 10 can be used to:

1) determine identity of text or graphics on documents 40 printed on physical media and removably attached to the surface 30, associating them with electronic documents accessible through information processing, maintenance and archival system 18;

2) sense the location of documents 40 or other physical artifacts on the surface 30, either in absolute coordinates or relative to other documents;

3) perform useful operations based on sensed actions performed by users of the information collage system 10, including, for example, modifications to application priorities based on location changes of documents 40;

4) electronically capture the contents of writings or annotations on documents 40 attached to the surface, automatically detecting any changes to attached documents 40 since the previous electronic capture of state of the information collage, with changes being logged to give a timestamped history of the state of the information collage;

5) sense visible features or markings on the surface 30, including frames around pin boards or tack boards, tape marking a border, scribbled annotations on papers or the wall, pieces of yarn linking papers, or ink gestures on the surface 30;

6) provide electronically controlled enhancement of the surface 30 using visual, auditory, or tactile markers (e.g. using light emitting diodes supported by pins holding documents, projected laser dots for highlighting, audible buzzers, or variations in surface 30 by slight projection or depression), either automatically or in response to user actions;

7) display more complete information relating to documents 40 present on the surface 30 (by projector 83 or by printing documents 82), in response to user requests; and 8) sense, interpret, and capture user actions relating to the information collage, with audio or video of the user being optionally recorded to capture, gestures, conversations or annotative comments.

As those skilled in the art will appreciate, the information collage can include use of hand-drawn diagrammatic symbols and physical representational artifacts such as icons and yarn. For example, links on hyperdocuments are in practice represented by stringing yarn from the locations of hypertext buttons on "from" pages to the hypertext destinations on "to" pages. For extracting curvilinear structure such as diagrammatic symbols including arrows, encirclings, brackets, and underlines, any suitable computer vision techniques known to those skilled in the art can be employed.

Alternatively, physical icons can have shapes and printed information that makes them both readily recognizable to humans and easily recognizable by computer vision techniques. For example, a large arrow icon cut out of posterboard and affixed with a magnet can be attached and moved around by users to a metallic whiteboard-backed surface to point at documents or other interesting items. The following is one embodiment of a computer vision procedure to recognize such an icon: (1) Perform color histogram and thresholding to extract large blobs from the camera image; (2) perform morphological opening to remove small and thin items; (3) compute a shape index based on circular moments; (4) index into a shape database using a Euclidean metric on the moment index. The second moment of inertia provides the arrow's orientation to 180 degrees and the third moment disambiguates which direction the arrow is pointing. Similar moment-based shape matching techniques such as are routinely used to classify industrial parts can be used to distinguish simple icons preprinted with shapes whose meaning can readily be inferred by humans, for example a star shape meaning "important", an "N" meaning "new", etc.

To better illustrate operation of the present invention, consider an example scenario in which a team needs to review a web site they are constructing. To provide visual, readily alterable feedback, the team prints out 12×9 inch paper sheets illustrating pages from the web site. These are tacked on a wall to form an information collage board 31 such as discussed in connection with FIG. 1. The sheets are identified by cameras positioned near the board. To make hypertext links, the team can use tack and strings to indicate hyperlinks. During team discussions, it is decided to alter the link structure and add a couple of new pages. The tack held strings are moved to indicate the link changes, while a couple of blank cards are tacked up to represent the new pages, with the content of those pages scribbled on the blank cards. String links to them are made to tie them into the web site. When a team member makes a thumbs-up gesture, the system 10 changes the actual link structure of the online web site. The wall representation is left up for others to review and comment on. If a team member comes up and wants to comment on the content of a particular page, he tacks small photo, tagged pin, or other physical icon that represents himself next to the page and makes a listen gesture. The system then records his comments, while also recording where he is pointing as he talks. Later, a team member can tap on physical icon to hear those comments replayed, or have a transcript printed.

Figure 2:
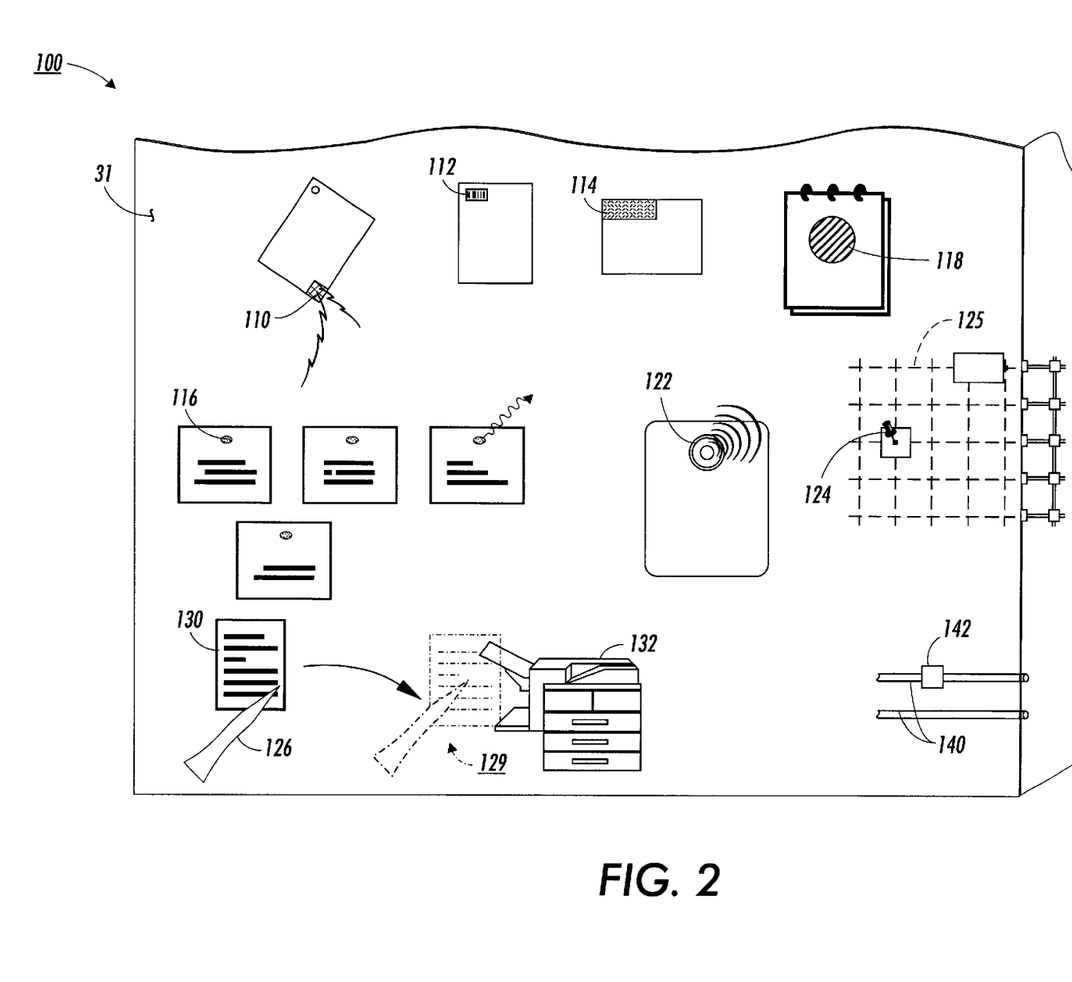
FIG. 2 schematically illustrates an enhanced information collage supporting various sensing modalities used by an identification unit.

As illustrated with respect to FIG. 2, the foregoing uses of the enhanced information collage of FIG. 1 can be enabled by various identification technologies for identifying physical artifacts. For example, as seen in FIG. 2, identification and relation of physical artifacts in an information collage system 100 can use various camera based optical viewing systems, infrared systems, acoustic systems, radiofrequency systems, or electromechanical systems. For example, a document can be clipped or bound to an internally powered (e.g. battery powered), or externally powered (e.g. inductively coupled) radio tag 110 that emits identifying data. In certain embodiments, infrared tags 116 or acoustic tags 122 can be used to identify physical artifacts. In other embodiments, an electromechanical grid 125 into which pins 124 can be placed, or an underlying antenna system 140 can be used to inductively couple to a data tag 142.

If laser or optical scanners are available, a bar code tag 112 can be used to identify physical artifacts such as documents, while two dimensional bar codes or glyph tags 114 can be used in conjunction with an external video camera to similarly identify documents. Cameras can also be used to identify colored patterns 118, shape of the physical artifact (e.g. printer icon 132), or other unique identifiers such as document layout, or textual patterning. Alternatively, the system can track user defined position 130 of documents for identification purposes, or even track position of pointers 126 that touch a position identified document. Such a pointer can act as a "virtual" document when moved to a position 129 adjacent to printer icon 132. Virtual documents can be projected by a suitable optical projector.

Figure 3:
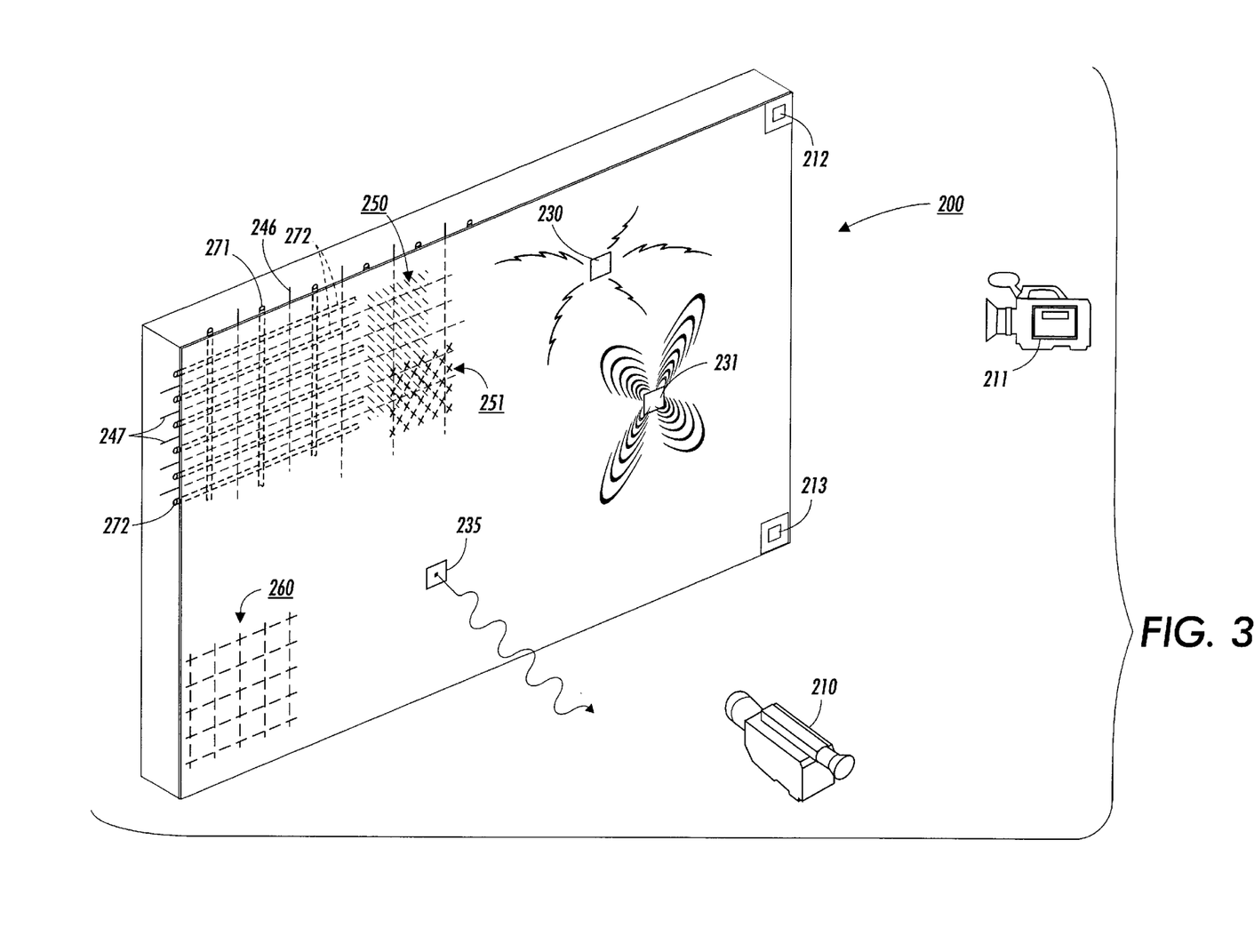
FIG. 3 schematically illustrates an enhanced information collage supporting various sensing modalities used by a location unit.

As illustrated with respect to FIG. 3, the enhanced information collage of FIG. 1 can also be enabled by various location technologies for tracking and locating physical artifacts. For example, as seen in FIG. 3, location and tracking of physical artifacts in an information collage system 200 can use various camera based optical viewing systems, infrared systems, acoustic systems, radiofrequency systems, or electromechanical systems. In one useful embodiment, one or more cameras 210 and 211 are used to track location of physical artifacts on an information collage surface. In certain embodiments, visual grids 260 can provide calibrating information to optical camera systems. In other embodiments, colored backgrounds 250, patterned backgrounds 251, or other suitable position identifiable background can be used to identify position by noting obscuration of the background. Infrared tags 235 can also be used to emit camera detectable positional information Non-optical based locating technologies can also be used in the present invention. For example, a document can be clipped or bound to an internally powered (e.g. battery powered), or externally powered (e.g. inductively coupled)

radio tag 230 or acoustic tag 231 that emits identifying data detectable by corner sensors 212 and 213. As will be appreciated, variations in detected power by sensors 212 and 213 can be converted into positional information for the tags. In other embodiments, an electromechanical grid (lines 246 and 247) into which pins can be placed, or an underlying antenna system (antenna lines 271 and 272) can be used to identify position by noting which horizontal and vertical lines are triggered, with the intersection of the lines providing position.

Figure 4:
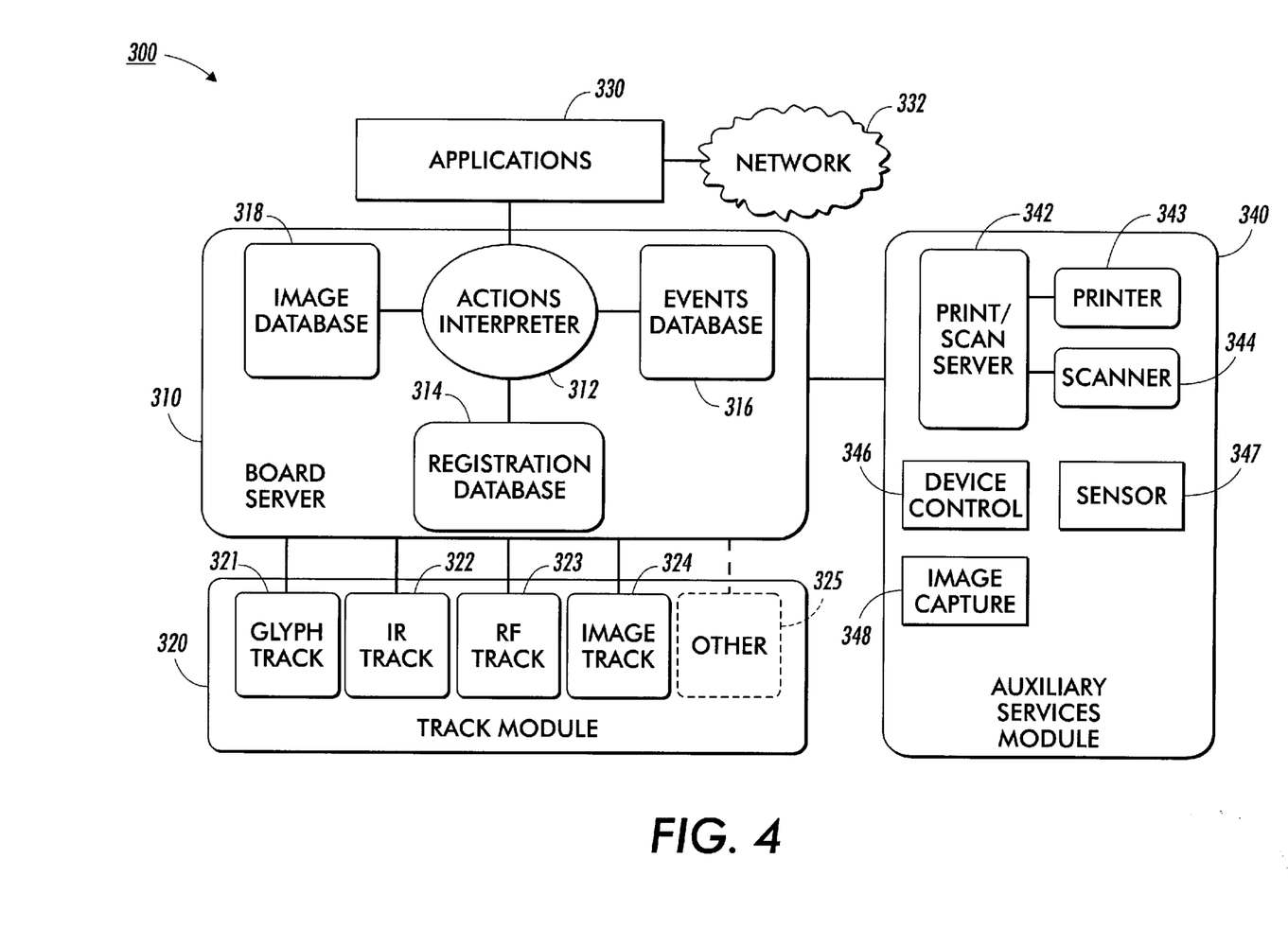
FIG. 4 is a schematic illustration of various modules underpinning an information maintenance and archival system.

FIG. 4 is a schematic illustration of one implementation of an identification/location, and information and retrieval system 300 in accordance with the present invention. As seen in FIG. 4, the system 300 is configured to track and identify surface mountable physical artifacts (i.e. physical icons) associated with virtual applications, documents or objects using a board server 310. The board server 310 is connected to a track module 320, applications 330, and various auxiliary services 340 for the purpose of providing digital services such as physical artifact tracking, identifying physical artifacts, and input/output to a user.

As seen in FIG. 4, the board server 310 maintains an event database 316 for representing current or past state of a board 31 such as illustrated in FIG. 1. The board server 310 includes an image database 318 of the board 31, an event database 316 that records and updates detected user actions or changes (events), and a registration database 314 (i.e. Registrar) that permits registration of application specific properties of artifacts on the board 31, such as association between a new document artifact and its electronically stored equivalent. Alternatively, the registration database 314 can be used to associate user input methods (e.g. hand gestures, physical icon orientation control schemes, etc.) with particular operations or digital services. An Action Interpreter 312 organizes and directs data to applications 330 in response to updates or changes in the databases 314, 316, and 318. A software implementation of board server 310 runs on any suitable computer system and can be written in C++ or other available programming language. The board server 310 provides an API for writing applications that depend upon tracking spatial location of physical artifacts, typically using a high level language such as Python, Perl, or Tcl.

The track module 320 tracks object identity and position using, for example, a two dimensional code tracker 321, an infrared (IR) tracker 322, a radiofrequency (RF) tracker 323, a camera based image tracker 324, and a miscellaneous sensor tracker 325 (which can be, for example, audio input, thermal input, or any conventional input scheme that a user might desire to have added to the system). Each of these foregoing track modules uses conventional techniques previously discussed in connection with FIGS. 2 and 3 to identify and locate surface position of tangible, physical artifacts placed on board 31.

The applications 330 can include custom designed software applications, commercially available applications such as spreadsheets, layout design packages, word processors, or other application accessible via application interfaces written to pass information between the board server 310 and applications 330. In addition, applications 330 will generally have access to network 332 for extended functionality and capabilities. As will be appreciated, communication between the board server 310 and applications 330 is generally two-way, with applications 330 being capable of controlling or accessing the board server 310 to initiate registration of new physical artifacts (e.g. an application directs printing of a bar code tagged document), or by adding images or events to the image data base 318 or event database 316.

The auxiliary services can include a print/scan server 342, device controller 346 (e.g. external digitally controllable cameras, sound level controllers, light level controllers, robotic controllers), and an image capture module 348 to periodically take a digital snapshot (or scan to take multiple snapshots) of surfaces supporting an information collage. External event sensors 347 that trigger events in response to detected changes can also be used. Such sensed quantities may be temperature, light level, switch status, or other quantity that does not necessarily require positional localization (such as may be provided by the track modules 320).

In operation, applications 330 register boards, regions, and artifacts; and they register action rules with the action interpreter 312. They can also record events in the Event Database 316, such as initialization events. The system is totally driven by action rules, which are triggered by events: The sensory modules (Track modules 320, Scanners 344, External Event Sensors 347) sense events and record them in the Event Database 316. After each event is recorded, the action interpreter 312 interprets all the Action Rules to decide what actions to take. Applications can deregister boards, physical artifacts, and actions.

The board databases consists of several different databases to represent the various aspects of the board. The board and the artifacts are observed by a camera as a visual scene. Thus, a board is represented as a set of regions, each region having a unique ID, and a set of artifacts which can occupy different visual regions on the board. Each region occupies a fixed extent on the board. The board as a whole is a region, and any rectangular area on the board can be registered as a region. Any physical artifact that can be put on the board can have a tag of some type (glyph, barcode, IR, etc.), which holds the ID for the artifact. Tagged artifacts can be moved around, and thus they must be tracked.

Each board has two necessary fixed properties:
 ID: bid
 size: <w,h>
Each region of a board has the following fixed properties:
 ID: rid
 board: bid
 extent: <xl,xr,yt,yb>
The special board region whole has extent <0,xr,0,yb>. Each artifact has the following fixed properties:
 ID: aid
 size: <w,h>
 tag-type: glyph I IR I . . .
tag-position: <x,y> (i.e. relative to the artifact)
As each artifact's is tracked, the following artifact properties are updated:
 board: bid (i.e., the board the artifact is attached to)
 location: <x,y> (i.e., relative to the board)
Each artifact has a computed extent property. If an artifact is not on a board, then its board and location are set to:
 NIL.
As the camera captures images of the regions and artifacts, the following property is updated:
 image name: filename
Finally, various application-specific properties can be defined. For example:
 document: filenameluri (i.e., a document the artifact represents) type: type (i.e., a semantic type the artifact or region represents)
The state and changes in state of the board and its regions is recorded in the Event Database 316, which consists of sequence of sensory event records of the following form:
 <time, bid, ridlaid, prop, value>
Every event happens at a particular time (at which it was sensed), on a particular board, on a particular region or artifact. The event is represented by assigning a new value to some property. For example, when an artifact is moved, its board and location properties are reset. The current state of the board can be assembled by scanning the Event Database in reverse-time order to accumulate the most recent values of all properties. Similarly, the board state any time can be assembled. A region snapshot consists of a list of the IDs and locations of all artifacts in the region as well as pointers to an image of the region and images of the artifacts in the region.

The captured images of regions and artifacts are stored in a separate Image Database 318 as a set of files. The image name properties in the Event Database 316 point to the files in the Image Database 318. The protocol for storing and retrieving from these databases is:

append-event(event)
    store-image(image, bid, ridlaid) (stores image and also creates and an event)
    retrieve-value(prop, ridlaid,time)
    retrieve-all-props(ridlaid,time)
    retrieve-all-AIDs(rid,time)
    retrieve-image(ridlaid,time)

The argument time can be current, previous, initial, or some particular time. The retrieval functions are exported in the board server's API.

Many properties cannot be sensed by the board server, but need to be registered by applications as a board and its artifacts are initialized for use. It is the role of the Registrar module 314 to export an API (and possibly a custom user interface) to do this. The protocol is:

register-board(size)→ bid
    register-region (bid,extent)→ rid
    register-artifact(size,tagtype,tagpos)→ aid
    append-event(event)
    deregister-region(rid)
    deregister-artifact(aid)

The Registrar 314 must manage the set of possible IDs. It assigns the next available ID when it registers new regions and artifacts; the ID is returned to the calling application. A registration is recorded by appending events in the database to define the properties of the new region or artifact. Other properties can be given by additional append-event calls. When a region or artifact is deregistered, all its properties are recorded as NIL, and its ID is then available for reuse in future registrations.

Track Module

The purpose of the Track module 320 is to keep track and capture the contents of the board and the location and contents of the physical artifacts on it. There are two modes of tracking: snapshot mode, where the board is tracked when triggered to do so by an external event, and dynamic mode, where the board is continually tracked and changes recorded as they are noticed. Dynamic mode can be implemented by the snapshot mode plus a timer generating regular events. Considering only the snapshot mode, the basic procedure for tracking is:

From an image of the whole board, find the locations of the tags.
  Recognize the IDs of the tags.
  Record changes of location in the Event Database.
  Capture images of the whole board, its regions, and its artifacts, as directed by the applications, and save these in the Image Database.

Track Modules 320 can be assisted by various other services. For example, an Image Capture module 348 can be called by the Track modules when needed. The Image Capture module 348 captures good-quality images of the board, regions, and extents of the artifacts and stores them in the Image Database 318; and it does this under direction of the Action interpreter 312. Similarly, a Print/Scan Server 342 supporting printers 343 and scanners 344 located near the board are desirable, primarily so that documents can be printed, scanned, and associated with physical artifacts on the board. For example, a scanner 344 near the board could work in conjunction with the board to scan documents with a higher resolution than may be possible from an externally positioned board camera. In this case, scanner server 342 decodes the tag to a physical artifact and then inserts the results in the Event and Image Databases 316 and 318. A second function for the scanner 344 would be to register scanned documents as new artifacts, allowing later printing of scanned documents with tags. As another example, a printer 343 can print tagged artifacts (e.g. physical icons tagged with barcodes, glyphs, or printed text). The call for this is:

print-artifact(size,tagtype,tagpos[,textimage])→ aid

This function first registers the artifact and then prints the tagged artifact, along with optional text or an image.

External Event Sensors

Other kinds of sensors 347 can be usefully incorporated into a information collage board allowing users to interact by other techniques than just moving artifacts around. The general scheme for doing this is to register a sensor as an artifact, and then have the sensor software add events to the Event Database when something is sensed. Consider two examples:

1. A button, such as a keyboard key. Register the button as an artifact, giving it an ID (sid). When the button is pressed, it calls append event(<time,sid,pressed,yes>).
  2. An RF Tag. Register the RF Tag Reader and some RF Tags as artifacts, giving them IDs (id1,id2, ... ). When the RF Reader detects an RF tag near it, it calls append-event(<time,,id1,sensed,id2>).

Image Services

Various kinds of image processing and recognition services could be usefully supplied by image track module 324, image capture module 348, or other auxiliary image processing services that might be required, including for example:

recognizing when two artifacts are next to each other;
  recognizing that one artifact is under another;
  recognizing that one physical artifact is indented under another;
  recognizing that a line is drawn (or string is stretched) between two artifacts;
  recognizing that a green dot has been marked next to an artifact;
  recognizing that a checkmark has been made on an artifact;
  generate a thumbnail image; composing a series of images as a vertical list
  providing projectable images (e.g. using an LCD projector) for display on a board; and
  providing displayable images on a touchscreen, cathode ray tube, or active matrix LCD display associated with an information collage system The list of services can of course be created, modified, extended, or limited as needed.

Action Interpreter

The Action interpreter module 312 saves a set of Action Rules sent to it by Application programs. An Action Rule is a condition-action statement interpreted by evaluating the condition part and, if true, executing the action part. Every time there is an append-event, all Action Rules are interpreted.
There are several different kinds of actions that can be specified in Action Rules:
- actions to direct the board server's activity
  - capture-image(rid)
- actions to interact with the user
  - print(document(id))
  - store(image(id),filename)
  - email(vanmelle,image name(id))
- actions to notify an Application program of an event
  - notify(app,eventno,event,<x,y>)

An Action Rule is written in a high level rule language that can be custom constructed and extended as necessary. For example, a rule that looks for an artifact of type person to be moved and notifies the application appears as:
  if board(event)=3 & prop(event)=moved & type(id (event))=person then notify(app4,3,event626).

Figure 5:
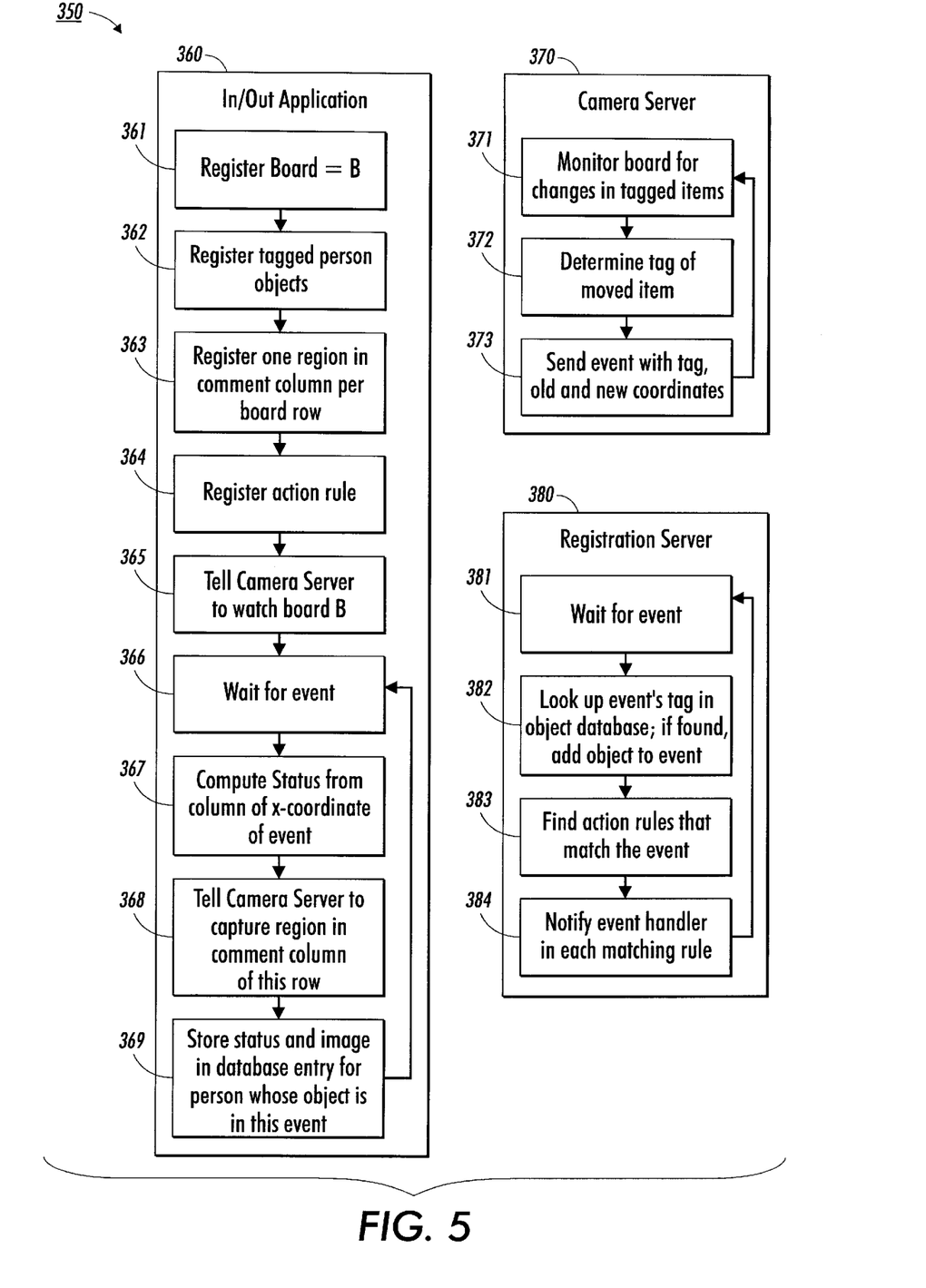
FIG. 5 is a flow chart illustrating program logic for one embodiment of the present invention.

Consider a simple example of an application. FIG. 5 is a flow chart 350 illustrating program logic for an "in/out" board that might function with the appropriate changes under the program architecture noted in connection with FIG. 4. An in/out or away board is a typical application that might be deployed in an information collage system according to the present invention. Consider a board or spatial region logically divided into three columns ("in", "out", "comment") and as many rows as there are members in the group, such as discussed hereafter in connection with FIG. 7. There is a tagged "person" object for each group member. Group members move their individual person objects between the in and out columns, and scribble comments in the comment column. The application's task is to maintain a database of who is in and out and the associated users' scribbled comments.

When the application 360 starts up, it contacts the registration server 380 to register the components necessary to communicate with a camera server 370: it registers the board itself, stating its coordinates (box 361); it registers each person object, stating its type (person), tag (a glyph number), and the associated person's name (box 362); for each row in the comment column, it registers a region, stating the coordinates of the rectangle enclosing the area to be used for comments (box 363); and finally, it registers an action rule, saying that it is interested in events whose location is the board and whose objects are of type person (box 364). It also notifies the camera server 370 to watch the board it just registered (box 365). Then it goes to sleep, waiting for events (box 366). The camera server watches the board for changes in tagged items (box 371). When a group member moves his person object from the "in" column to the "out" column, the camera server sees that a tag has moved. It zooms in on the tag to collect its id (box 372). It then sends an event of type "move" to the registration server, stating the tag's id and its new and old coordinates (box 373). The registration server 380 receives the event and looks up the tag id in its database, finding one of the objects previously registered by the application, and adds the object identification to the event (box 382). It then looks through its action rules for rules that match the event (box 383). It finds the rule registered by the application, verifies that it matches, and sends the event to the application (box 384).

When the application 360 receives the event, it uses the coordinates to determine the "in or out" status (box 367). The camera server is asked to capture the image of the rectangle in the "comments" column of the person's row (box 368). It stores the new status and the image in the database entry for the person associated with the object in the event (box 369) resumes waiting for events (box 366).

Figure 6:
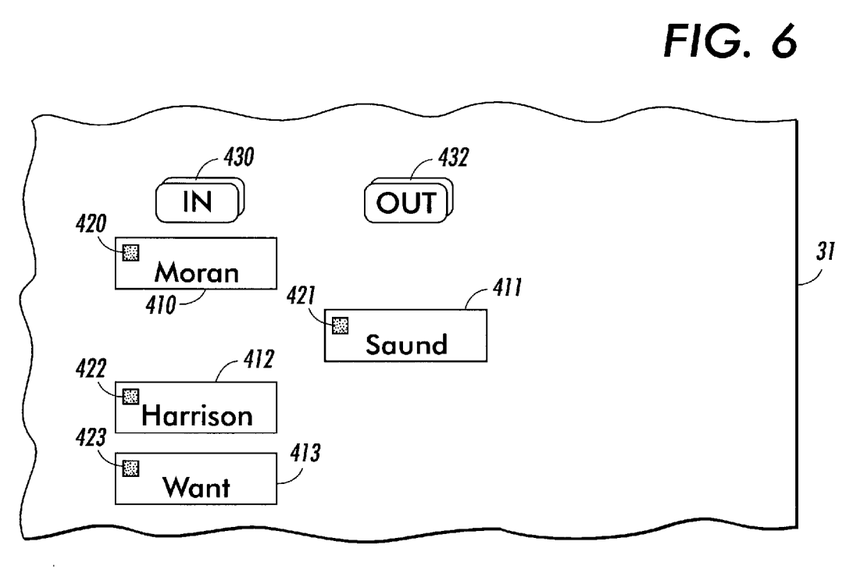
FIGS. 6 and 7 illustrate operation of an "in/out board" system.
Figure 7:
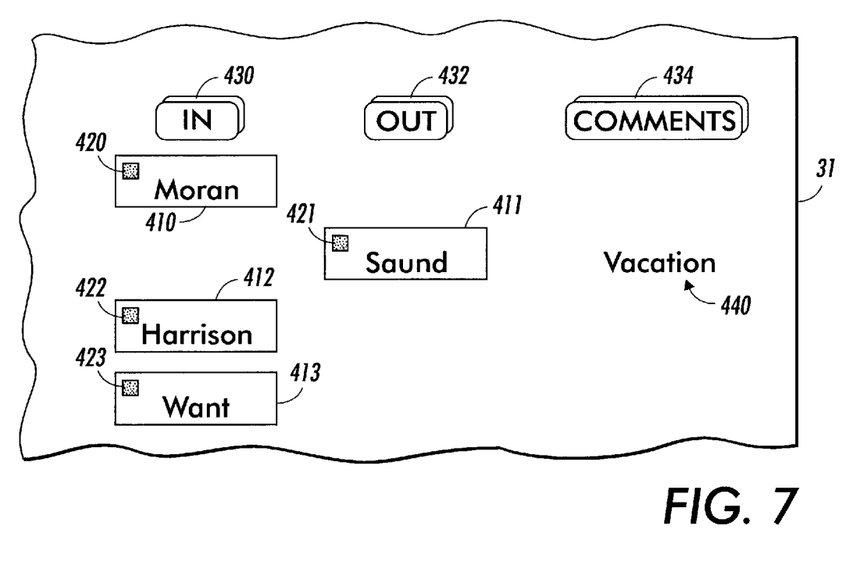

FIGS. 6 and 7 illustrate physical appearance of a physical icon based "in/out" or "away board" system operable in a manner similar to that described in connection with FIG. 5. As seen in FIG. 6 a spatial region of a board 31 is logically divided into two columns headed by a physical icon 430 textually labeled "IN" and a physical icon 432 textually labeled "OUT". As seen in FIG. 6, group members Moran (represented by notecard 410 with identifying tag 420); Harrison (represented by notecard 412 with identifying tag 422); and Want (represented by notecard 413 with identifying tag 423) are present in the office. Group member Saund (represented by notecard 411 with identifying tag 421) is away from the office, so his notecard 411 is positioned under the "OUT" icon 432. This system is simple to change or augment, as illustrated in connection with FIG. 7. By addition of a physical icon 434 labeled "COMMENTS" and suitable registration techniques such as previously described in connection with FIGS. 4 and 5, scribbled comments in the comment column (e.g. the textual annotation "Vacation") can be associated with "Saund" in the application running the in/out board.

Figure 8:
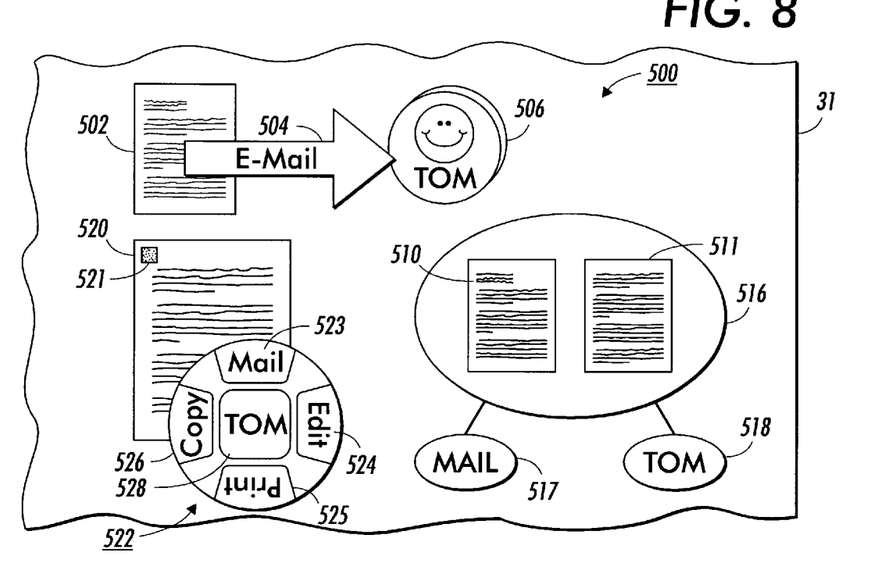
FIG. 8 illustrates operation of an operator icon that modifies data handling of other icons.

As illustrated with respect to FIG. 8, an information collage 500 can support use of physical icons to "operate" on documents or other physical artifacts. Data can be altered, combined, erased, saved, augmented, transferred, or otherwise modified through provision of various digital services associated with such operator icons. For example, a document 502 on board 31 can be associated with an e-mail operator icon 504 that directs an information collage to mail an electronic document associated with document 502 to "TOM", a person associated with the physical icon 506.

Alternatively, operating to e-mail a document 520 (identified by optically readable tag 521) to TOM can use a physical icon 522 constructed by placing a TOM icon 528 at a center of the circle shaped physical icon 522. The TOM icon 528 is surrounded with various operator icons such as MAIL icon 523, EDIT icon 524, PRINT icon 525, and COPY icon 526 which are removably attached (e.g. by magnets, clips, or low tack adhesives) to circular physical icon 522. Placing this icon 522 on document 520 causes the information collage 500 to determine the desired operation (in this case MAIL an electronic document, since MAIL is in an upright, readable position) and operate to mail electronic documents associated with document 520 to "TOM", a person associated with TOM icon 528.

In yet another alternative electronic mailing procedure suitable for use in an information collage system of the present invention, user drawn lines 516 can be used to direct an information collage 500 to mail an electronic documents associated with physical documents 510 and 511 to "TOM", a user associated with the TOM icon 518. In practice, a user takes MAIL icon 517 and a TOM icon 518, and draws line 516 on board 31 to encircle the desired documents 510 and 511. This operates to mail the electronic documents associated with the line selected documents to user TOM.

Figure 9:
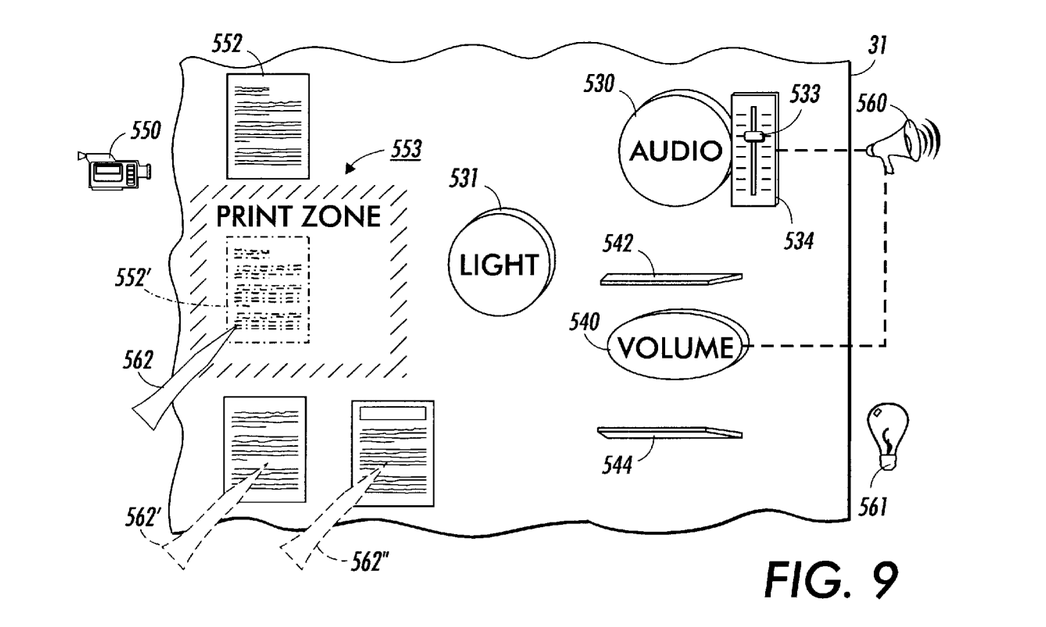
FIG. 9 illustrates another operator icon that modifies data handling of other icons.

FIG. 9 illustrates more examples of operator icons. An information collage on board 31 can support generic "sliders", two element physical icons (slider 533 and slide base 534, with the slider 533 movable with respect to the slide base 534). Such sliders can be used as input control devices for various sensed physical states (e.g. controlling light, sound, temperature levels) or other states conducive to slider control. In FIG. 9, the slider is associated as a control with an audio speaker 560 by positioning an AUDIO icon 530 in touching contact (or merely adjacent) to the slider. As will be appreciated, the particular device controlled could be easily changed, for example, to a light 561 by substituting LIGHT icon 531 in place of AUDIO icon 530.

Alternatively, a VOL icon 540 can be permanently associated with audio systems. Whenever VOL icon 540 is placed between two icons 542 and 544, spatial movement of icon 540 between icons 542 and 544 functionally acts in a manner similar to moving slider 533 as previously discussed. Yet another embodiment of spatially defined operators. For example, a document 552 can be moved into a discrete "PRINT ZONE" (an operation detectable by camera 550 and appropriate image processing software) to activate printing of new copy of the document. An alternative printing technique may use pointer 562 to indicate documents that need to be printed. If the pointer is touched to the PRINT ZONE (either before or after touching the documents), the touched documents can be reprinted by a suitable attached printer.

Figure 10:
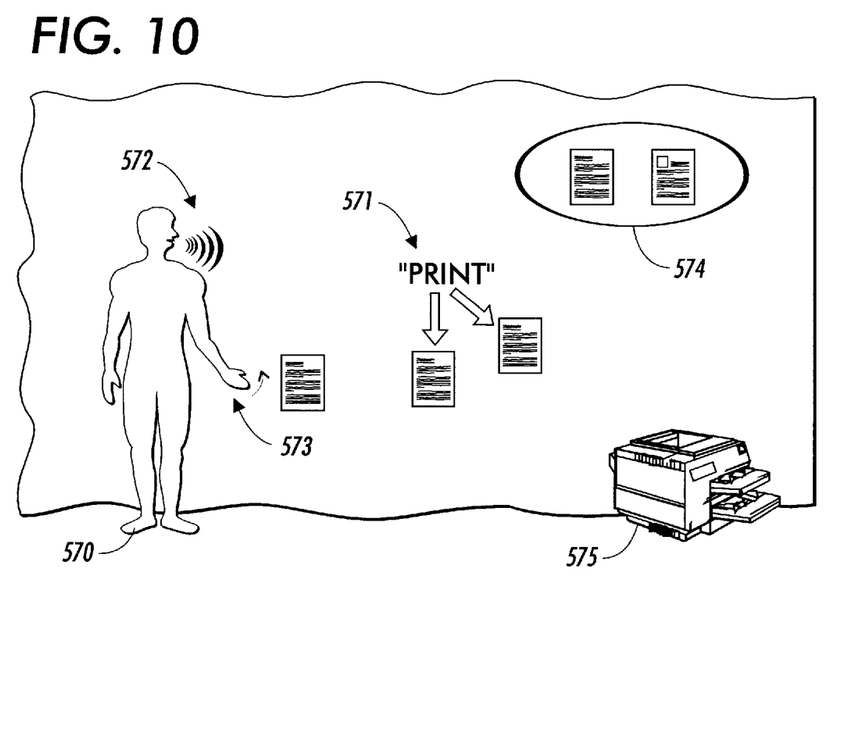
FIG. 10 illustrates several modes or mechanisms for dynamic definition of function of an operator icon by a user.

In addition to using physical icons having predefined or previously registered functions, the present invention contemplates use of icons that can be dynamically related, modified or changed by a user standing at a board. This can be done using various interaction modes. For example, in FIG. 10 a user 570 can dynamically define a print operator to act upon documents using written textual command 571, audible commands 572, gestural command 573, drawing command 574 (line encircling documents), or even a physical operation such as moving a small printer 575 into the information collage area and briefly resting a document on the printer 575. These various modes can of course be extended with other known input modes.

Figure 11:
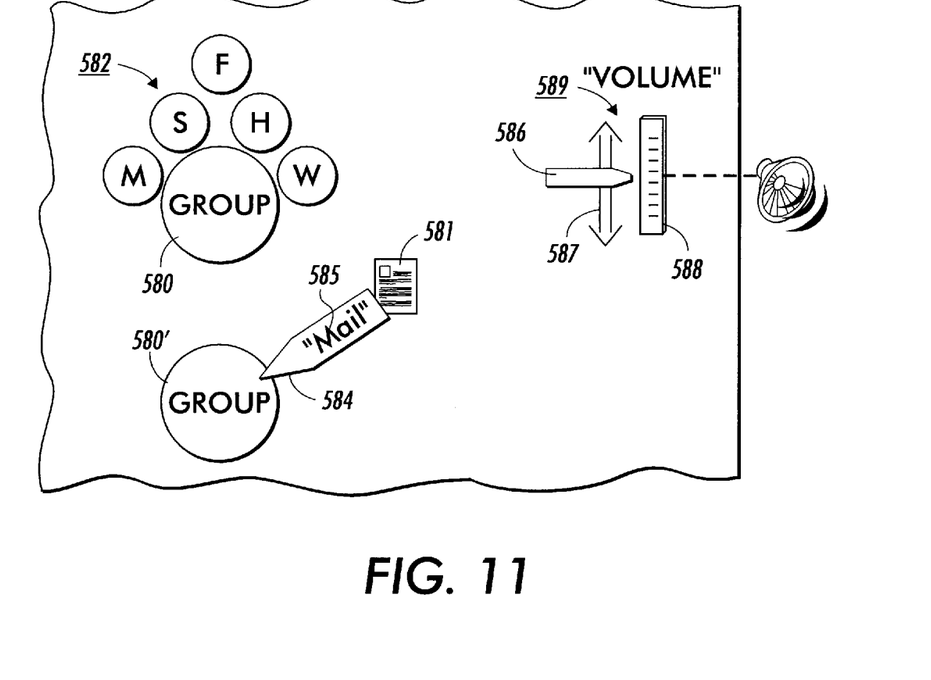
FIG. 11 illustrates multiple physical icons used to define function of an operator icon by a user.

Dynamic user definition of operations or physical icon functions is also illustrated in FIG. 11. As seen in FIG. 11, a user can dynamically define a GROUP icon 580 by touching various possible user tokens (e.g. tokens, M, S, H, and W) to icon 580. The touched user tokens are associated by the information collage as a group represented by GROUP icon 580, while untouched icons such as token F are not included in that group. The association of members of the group can be permanent, semi-permanent, redefined daily, or defined as often as needed.

As also seen in FIG. 11, generic operator icons can be dynamically defined by a user. For example, if a user wants to mail document 581 to members of the group previously associated with GROUP icon 580, a generic pointer 584 can have the word "MAIL" 585 written on its surface to make it an electronic mail operator. If the pointer 584 is then positioned to point from the document 581 to the GROUP icon 580, the document is electronically mailed to all members of the group. The pointer 584 can be reused by erasing the text "MAIL", and creating a slider 586 that is movable with respect to slide base 588 (up or down in the direction noted by arrows 587). This can operate to control audio volume for logically connected speakers after a user registers the association by writing "VOLUME" in text 589 above the slider 588.

As those skilled in the art will appreciate, the use of operators, whether predefined or constructed by users "on the fly" at a board, permits construction of powerful symbolic, gestural, audio, or visual languages for interfacing with an information collage in accordance with the present invention. For example, each differently shaped, colored, marked, or identified physical icon in the information collage can be associated with a particular digital service or attribute. Although the wide variety of easily distinguishable icons and spatial positioning characteristics (icons being inverted, moved adjacent, moved to overlap, identified with pointers, drawn arrows, etc.) would alone provide a powerful user interface, the use of an archival (i.e. event) database in the present invention further extends the flexibility of the information collage based user interface by supporting computer control based on a temporally differentiated icon input, with temporally synchronous (or asynchronous) tuples of one or more icons (e.g. particular identified icons and sensed states) operating on data. Single and multiple icons can in turn be extended by participation in a "sentence". A sentence is defined as a sequence of one or more temporally disjoint icon attributes or positionings. The sentence level allows definition of an input grammar by appropriate choice of sequence or position, and corollary rules governing, for example, use of active verb-like icons (e.g. "print"), naming noun-like sensemes (e.g. DOC1.TXT), or connectors (e.g. AND).

Figure 12:
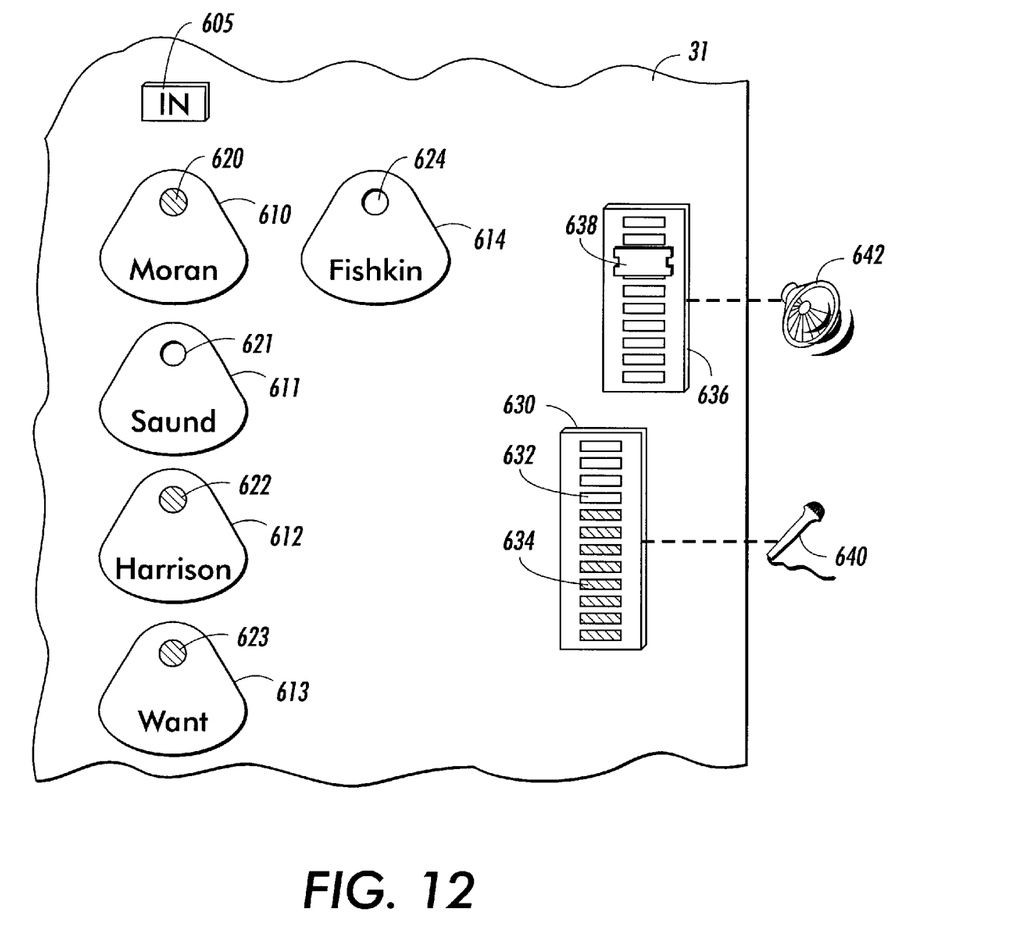
FIG. 12 illustrates both predetermined and user defined icons that display information related to information collage status or external controlled or sensed events.

In addition to controlling data or external objects, physical icons can be used to display changes in data or sensed quantities and values. For example, FIG. 12 illustrates both predetermined and user defined icons that display information related to information collage status or external controlled or sensed events. A simple in/out board can be constructed using an IN icon 605, under which icons 610, 611, 612, and 613 are positioned. Each of these icons respectively has status light 620, 621, 622, and 623 that is activated when the associated person is detected (using smart cards, electronic sign-in, or other suitable person identification scheme) as being present in the building. In the present example, status light 621 is not lit since its associated user is not present in the building. Note that status light 624 of icon 614 is unlit, but no inference as to presence/absence can be made, since the icon 614 is not associated with the in/out board application. As will be appreciated, association with the in/out board application would require positioning of icon 614 in the region underneath the IN icon 605.

In yet another application illustrating icon based monitoring/control of external equipment, generic light tracks 630 and 636 can be respectively associated with input microphone 640 and output speaker 642. The ambient noise in a room is displayed by the ratio of unlit lights 632 to lit lights 634. Control of speaker generated sounds is accomplished by associating a slider 638 with light track 636, illustrating use of generic components for both display and control.

As those skilled in the art will appreciate, other various modifications, extensions, and changes to the foregoing disclosed embodiments of the present invention are contemplated to be within the scope and spirit of the invention as defined in the following claims.

The claimed invention is:

1. An enhanced information collage having a surface for detachable support of a plurality of collage components, the enhanced information collage comprising an identification unit for determining informational content of at least some of the plurality of collage components, a location unit for tracking position of at least some of the plurality of collage components, an information maintenance and archival system connected to the identification unit and the location unit for storing state records of position and informational content of at least some of the plurality of collage components, with the information maintenance system being updateable to reflect changes in position and informational content of the at least some of the plurality of collage components, and at least one operator icon for modifying electronic data associated with collage components in response to physical association of the operator icon with at least one collage component.

2. The enhanced information collage of claim 1, wherein at least some of the plurality of collage components have attached identification tags for generating signals that enable determination of operator data by the identification unit.

3. A method for interfacing with a computer system with collage components, the method comprising the steps of registering a collage component to have a default association with a first digital service, and physically associating an operator icon with the collage component to at least temporarily associate the collage component with a second digital service.

4. The method of claim 2, wherein at least one of the first and second digital services is printing electronic documents.

5. The method of claim 2, wherein at least one of the first and second digital services is launching an executable application.

* * * * *